(12) United States Patent
Tsuchiya

(10) Patent No.: US 9,796,120 B2
(45) Date of Patent: Oct. 24, 2017

(54) INJECTION MOLDING SYSTEM

(71) Applicant: FANUC Corporation, Yamanashi (JP)

(72) Inventor: Nobuatsu Tsuchiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 181 days.

(21) Appl. No.: 14/920,052

(22) Filed: Oct. 22, 2015

(65) Prior Publication Data

US 2016/0114513 A1    Apr. 28, 2016

(30) Foreign Application Priority Data

Oct. 23, 2014  (JP) .................. 2014-216252

(51) Int. Cl.
*B29C 45/17*  (2006.01)
*B29C 45/76*  (2006.01)

(52) U.S. Cl.
CPC .......... *B29C 45/7686* (2013.01); *B29C 45/17* (2013.01); *B29C 45/1769* (2013.01)

(58) Field of Classification Search
CPC ................................ B29C 45/1769–45/1773
See application file for complete search history.

(56) References Cited

U.S. PATENT DOCUMENTS

2014/0285805 A1* 9/2014 Hermle .................. G01J 3/50
                                                    356/402

FOREIGN PATENT DOCUMENTS

| CN | 101190561 A | 6/2008 |
|----|-------------|--------|
| CN | 102303397 A | 1/2012 |
| JP | 7-290542 A | 11/1995 |
| JP | H09-123232 A | 5/1997 |
| JP | 2003-127177 A | 5/2003 |
| JP | 2003-247948 A | 9/2003 |
| JP | 2007-114180 A | 5/2007 |
| JP | 2009-172504 A | 8/2009 |
| JP | 2012-214008 A | 11/2012 |
| JP | 2013-024852 A | 2/2013 |
| JP | 2013-86358 A | 5/2013 |

OTHER PUBLICATIONS

Office Action dated Jan. 26, 2016, in Japanese Patent Application No. 2014-216252.
Office Action in CN Application No. 201510691537.1, dated Mar. 15, 2017.

* cited by examiner

*Primary Examiner* — Jill Heitbrink
(74) *Attorney, Agent, or Firm* — Hauptman Ham, LLP

(57) ABSTRACT

An injection molding system for making a molded item freely fall in demolding process from a mold, the injection molding system comprising:
a molded item photographing device, an image analysis device, and a molded item classification device, wherein the image analysis device is configured to perform analysis of appearance feature of the molded item, and make the item classification unit classify the molded item based on result of the analysis.

9 Claims, 3 Drawing Sheets

| SHOT NUMBER | CAVITY NUMBER | NON DEFECTIVE OR NOT |
|---|---|---|
| 1 | 1 | NON DEFECTIVE |
|  | 2 | NON DEFECTIVE |
|  | 3 | DEFECTIVE |
|  | 4 | NON DEFECTIVE |
| 2 | 1 | NON DEFECTIVE |
|  | 2 | NON DEFECTIVE |
|  | 3 | DEFECTIVE |
|  | 4 | NON DEFECTIVE |

INJECTION MOLDING SYSTEM

RELATED APPLICATIONS

The present application claims priority to Japanese Application Number 2014-216252, filed Oct. 23, 2014, the disclosure of which is hereby incorporated by reference herein in its entirety.

BACKGROUND OF THE INVENTION

1. Field of the Invention

The present invention relates to an injection molding system configured to perform a set of work of inspecting, classifying, and packing the molded item fallen freely from a molding device continuously and in short time.

2. Description of the Related Art

The present invention relates to an injection molding system configured to perform a set of work of inspecting, classifying, and packing the molded item fallen freely from a molding device continuously and in short time.

In molding by an injection molding machine, there is a case in which a molded item is made to fall to a box for reducing cycle time. The molded item in the box is sent to inspection process and inspected whether the item is defective or not by an image processing inspection device. At the inspection, the molded items loaded in bulk need to be set on the image processing inspection device one by one, requiring man hours.

When the molded item is inspected by the image processing inspection device, it is necessary to inspect portions liable to crack or have burring, but there is a case in which the portions can be inspected only at specified angle based on the place of the portions.

A technique disclosed in Japanese Patent Laid-Open No. 2013-24852 performs inspection more simply an less expensively by showing a face of a workpiece to be inspected by an articulated robot. The articulated robot releases the workpiece in non defective item chute when the item is non defective, and releases the item in defective item chute when the item is defective.

In a technique disclosed in Japanese Patent Laid-Open No. 9-123232, a plurality of molded items simultaneously molded by a mold are grasped and taken out by a plurality of grasping units of a take-out hand, arranged at targeted molded item pitch during conveyance, and sent to the next process.

Though effective inspection process is proposed in Japanese Patent Laid-Open No. 9-123232, a processing line includes not only the inspection process but also molding process, packing process, and the like before or after the inspection process. Therefore, it is necessary to reduce the total time throughout the all processes.

In a technique disclosed in Japanese Patent Laid-Open No. 9-123232, since the molded items are taken out by take-out units, time for the take-out unit to move in the mold is required. In addition to that, a large sized hand equipped with a movement mechanism of the molded item is required and time is taken for the taking out of the molded item.

SUMMARY OF THE INVENTION

An injection molding system according to the present invention is one for making a molded item freely fall in demolding process from a mold, the injection molding system including a molded item photographing device for capturing image of the molded item fallen freely, an image analysis device configured to perform image analysis of the image photographed by the molded item photographing device, and a molded item classification device configured to classify the molded item to one of a plurality of predetermined regions based on result of the image analysis, wherein the image analysis device is configured to perform analysis of appearance feature of the molded item, and make the item classification unit classify the molded item based on result of the analysis.

The molded item photographing device may be fixed to the molded item classification unit.

The molded item photographing device may be fixed and configured to photograph free fall region of the molded item falling freely.

The injection molding system according may include, a first molded item photographing device for capturing image of the molded item fallen freely and determining position of the molded item, a second molded item photographing device for photographing the molded item to analyze image of the molded item, and a molded item movement device configured to grasp the molded item at the position of the molded item determined by the first molded item photographing device and move the molded item to photographing position for photographing the molded item by the second molded item photographing device, wherein the image analysis unit is configured to analyze the image photographed by the second molded item photographing device.

The first molded item photographing unit may be fixed to the molded item movement device.

The second molded item photographing unit may photograph free fall region of the molded item.

The appearance feature of the molded item may include at least one of, whether presence of defective part in molding, cavity number transcribed to the molded item, configuration of the molded item, and color of the molded item.

At least one of the plurality of predetermined regions may be a region on a molded item conveyer.

At least one of the plurality of predetermined regions may be a region in a storing box or in a storing vessel for containing the molded item.

The molded item classification device may align the molded item at the predetermined region.

The molded item classification device and the molded item movement device may be the same device.

The injection molding system according may further includes a communication unit configured to output the result of analysis of the image analysis device, wherein result of analysis or result of classification is configured to be input to production management process data of the injection molding system.

The present invention, with the above configuration, can provide an injection molding system with reduced cycle time by performing a set of work of inspecting, classifying, and packing of the molded item fallen freely from the molding device continuously and in short time.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Figure 1:
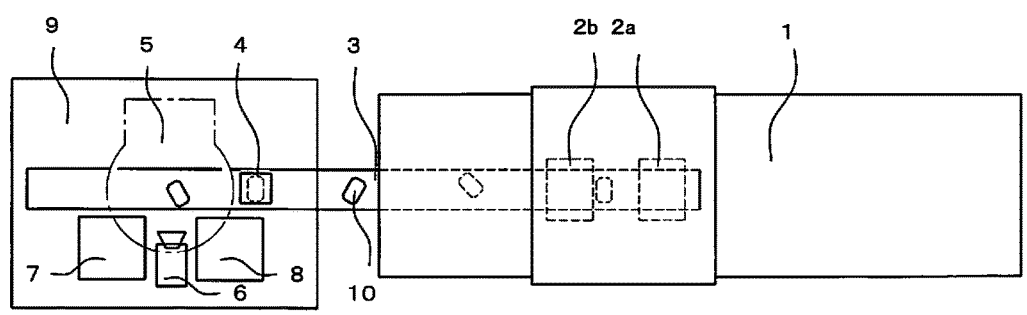
FIG. 1 is a top view of an injection molding system.
Figure 2:
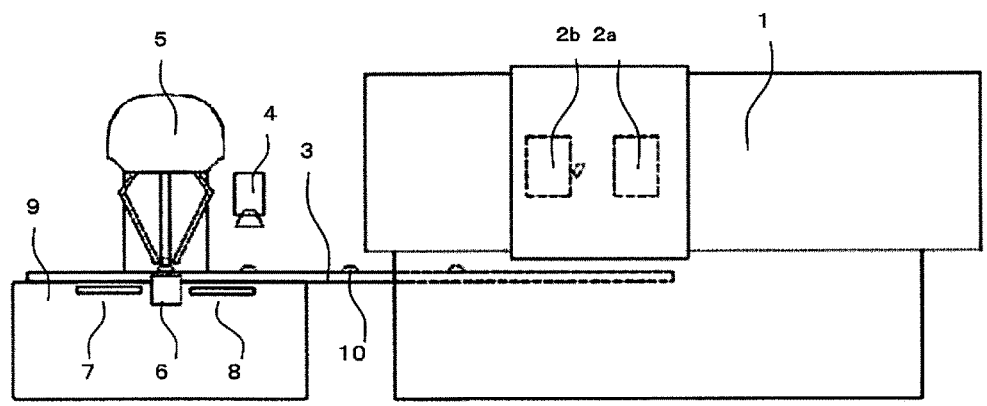
FIG. 2 is a front view of an injection molding system.

FIGS. 1, 2 are a schematic diagram of an injection molding system according to the present invention. The injection molding system consists of an injection molding machine 1, a mold 2, a conveyer 3, a position determination camera 4, a parallel link robot 5, an image processing inspection camera 6, a non defective item packing box 7, a defective item packing box 8, and a stand 9.

The parallel link robot 5 works as a molded item movement device, a molded item classification device, and an image analysis device. The image processing inspection camera 6 corresponds to the molded item photographing device in claim 1, and the second molded item photographing device in claim 4. The position determination camera 4 corresponds to the first molded item photographing device in claim 4.

Figure 3A:
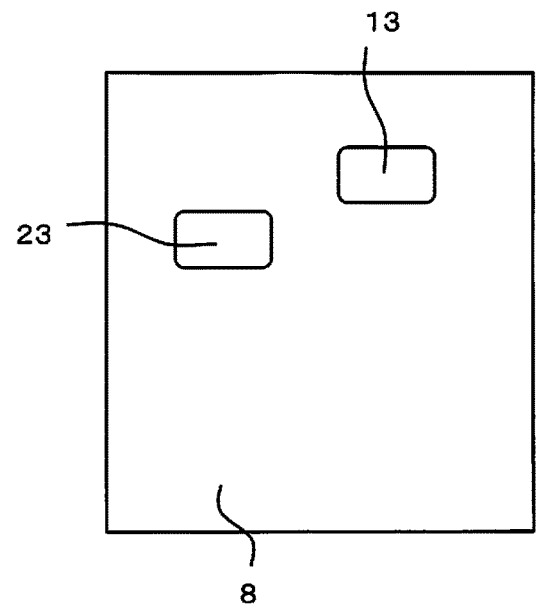
FIGS. 3A and 3B are diagrams illustrating classification and alignment of a molded item.
Figure 3B:
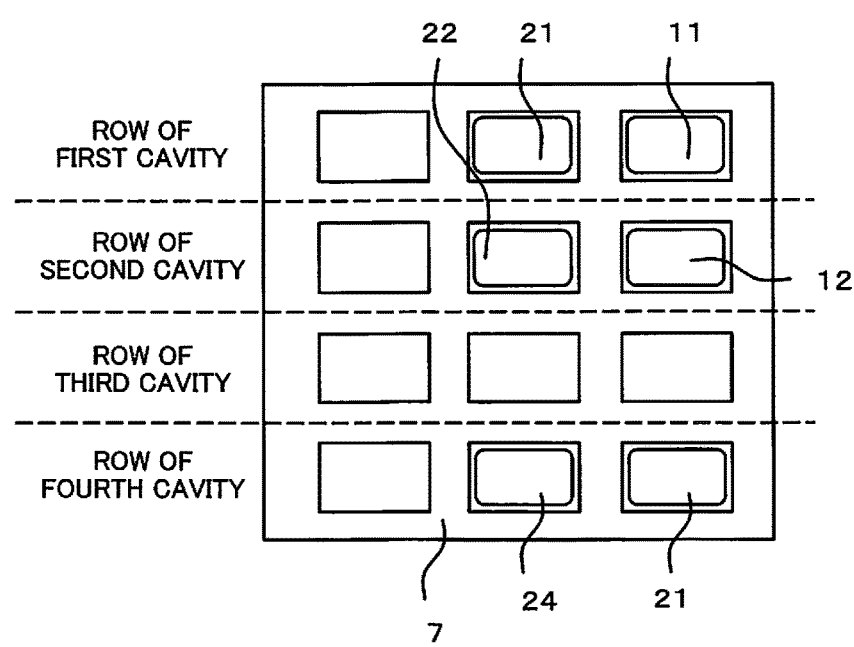

A molded item 10 molded in the mold 2 of the injection molding machine 1 is demolded by ejection by an ejector not shown in the figure, to fall on the conveyer 3 installed below the mold 2, after the stationary mold 2a and a movable mold 2b are opened. At the falling, position and direction of the molded item are random. After the position determination camera 4 detects the molded item 10 conveyed by the conveyer 3, the parallel link robot 5 grasps the molded item. The parallel link robot 5 shows the grasped molded item 10 to the image processing inspection camera 6, and packs the molded item 10 in the non defective item packing box 7 when the molded item is a non defective item, and releases the molded item 10 in the defective item packing box 8 when the molded item is a defective item, as shown in FIG. 3. The parallel link robot 5 turns the molded item 10 such that the molded item 10 can be contained in a partitioned space in the non defective packing box 7, before the parallel link robot 5 packs the molded item 10 in the non defective packing box 7.

Cavity number is usually stamped on the molded item, and the molded item is usually managed according to a cavity, since it can be determined to which molded item is defective when the defective items are generated by a specific mold core which is damaged. Therefore, the cavity number of the molded item 10 is determined when the position determination unit 4 photographs the molded item 10, and the parallel link robot 5 packs the molded item 10 in each region corresponding to each cavity number. In FIG. 3, rows corresponding to each cavity number are provided in the non defective item packing box 7, and the molded item in the first cavity is packed in a row of the first cavity. Similarly, the molded item in the second cavity is packed in a row of the second cavity, the molded item in the third cavity is packed in a row of the third cavity, and the molded item in the fourth cavity is packed in a row of the fourth cavity.

As mentioned above, in the present embodiment, a set of work of inspecting, classifying, and packing the molded item fallen freely from the molding device can be performed continuously and in short time.

In the present embodiment, the molded item is classified based on the presence of a defective part in molding and the cavity number transcribed to the molded item 10, but molded item identification number, configuration of the molded item, color of the molded item may be used for the classification.

In the present embodiment, the molded item is packed in the packing box, but the molded item may be aligned on a palette or a conveyer.

The conveyer 3 may be moved in constant speed or by pitch feeding. When the conveyer 3 is moved in constant speed, movement distance of the molded item during time from when the position determination camera 4 photographs to when the parallel link robot 5 grasps the molded item is corrected using an encoder or calculation based on speed of the conveyer. When the conveyer 3 is moved by pitch feeding, the conveyer 3 is moved for a fixed distance after all molded items 10 in a range photographed by the position determination camera 4.

A plurality of parallel link robots may be used as a molded item movement device. A plurality of parallel link robots may be used for each of the molded item movement device and the molded item classification device.

The molded item movement device may be a parallel link robot or an articulated robot. The image processing inspection camera 6 may be fixed such that the image processing inspection camera 6 can photograph the free fall region where the molded item freely falls. More specifically, the molded item may be fallen to, for example, a saucer instead of the conveyer 3, and the robot may grasp the itemed item on the saucer.

Figures 4, 5:
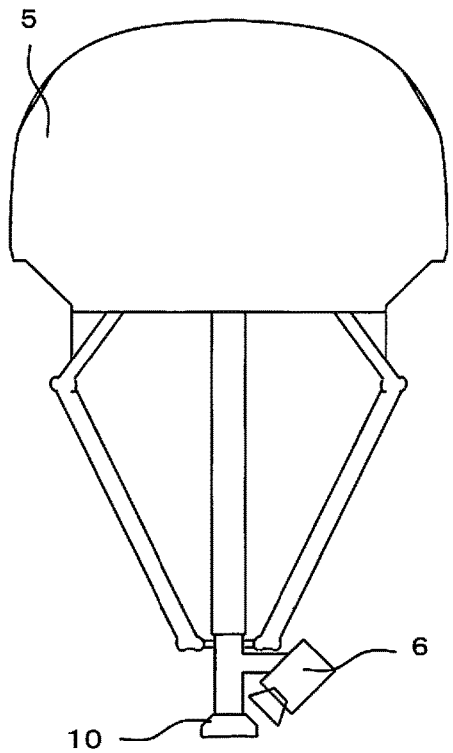
FIG. 4 is a view illustrating a parallel link robot to which an image processing inspection camera is fixed
FIG. 5 is a diagram illustrating production management process data of an injection molding machine of classification and alignment of a molded item shown in FIG. 3.

The image processing inspection camera 6 may be fixed to the parallel link robot 5 as shown in FIG. 4. Operation of the parallel link robot 5 to grasp the molded item 10 and show the molded item 10 to the image processing inspection camera 6 can be omitted, thus the cycle time can be reduced.

When the image processing inspection camera 6 determines that the molded item 10 is defective, the image processing inspection camera 6 transmits the information to the injection molding device 1. As shown in FIG. 5, the injection molding machine 1 stores data of shot number at which the molded item is defective as production management process data. The operator can easily grasp in what molding condition the defective item generates.

A bucket may be set on the conveyer 3 for precisely determining the shot number of the molded item the image analysis device analyzing the image thereof, and the conveyer may be fed at each shot time for a pitch of the bucket. The molded items for a shot fall from the mold to one bucket, thus the molded items of the first shot, those of the second shot, those of the third shot, and so on are conveyed to the image processing inspection camera 6.

The invention claimed is:

1. An injection molding system for making a molded item freely fall in a demolding process from a mold, the injection molding system comprising:
    a first molded item photographing device for capturing an image of the molded item falling freely and determining the position of the molded item;
    a second molded item photographing device for photographing the molded item to analyze the image of the molded item;
    a molded item movement device configured to grasp the molded item at the position of the molded item that has been determined by the first molded item photographing device and move the molded item to a photographing position for photographing the molded item by the second molded item photographing device;

an image analysis unit configured to analyze the image of the molded item that has been photographed by the second molded item photographing device; and a molded item classification device configured to classify the molded item into one of a plurality of predetermined regions based on the result of the image analysis where the appearance features of the molded item are analyzed by the image analysis device.

2. The injection molding system according to claim 1, wherein the first molded item photographing unit is fixed to the molded item movement device.

3. The injection molding system according to claim 1, wherein the second molded item photographing unit is configured to be fixed so as to photograph a free fall region of the molded item.

4. The injection molding system according to claim 1, wherein the appearance features of the molded item include at least one of the existence of a defective part in the molding, a cavity number transcribed to the molded item, a molded item identification number transcribed to the molded item, the shape of the molded item or the color of the molded item.

5. The injection molding system according to claim 1, wherein at least one of the plurality of predetermined regions is a region on a molded item conveyer.

6. The injection molding system according to claim 1, wherein at least one of the plurality of predetermined regions is a region in a storing box or in a storing vessel for containing the molded item.

7. The injection molding system according to claim 1, wherein the molded item classification device is configured to align the molded item at the predetermined region.

8. The injection molding system according to claim 1, wherein the molded item classification device and the molded item movement device is the same device.

9. The injection molding system according to claim 1, further comprising:

a communication unit configured to output the result of analysis of the image analysis device; wherein the result of analysis or the result of classification is configured to be inputted into the production management process data of the injection molding system.

\* \* \* \* \*